(12) United States Patent
Megdal

(10) Patent No.: US 8,826,815 B2
(45) Date of Patent: Sep. 9, 2014

(54) DEVICE FOR REMOVING BREADING OF BAKED ITEMS

(76) Inventor: Elliot Megdal, Los Angeles, CA (US)

( * ) Notice: Subject to any disclaimer, the term of this patent is extended or adjusted under 35 U.S.C. 154(b) by 248 days.

(21) Appl. No.: 13/206,193

(22) Filed: Aug. 9, 2011

(65) Prior Publication Data
US 2012/0227593 A1 Sep. 13, 2012

Related U.S. Application Data

(60) Provisional application No. 61/451,307, filed on Mar. 10, 2011.

(51) Int. Cl.
*A01F 11/06* (2006.01)
*A47J 43/28* (2006.01)
(52) U.S. Cl.
CPC .................................... *A47J 43/28* (2013.01)
USPC ............................................................ 99/567
(58) Field of Classification Search
USPC .............................................. 99/567; 30/425
See application file for complete search history.

(56) References Cited

U.S. PATENT DOCUMENTS

| | | | | |
|---|---|---|---|---|
| 1,080,312 A | * | 12/1913 | Wehner | 30/130 |
| 2,008,725 A | * | 7/1935 | Parker | 249/74 |
| 2,733,100 A | * | 1/1956 | Simonsen | 30/287 |
| 3,456,346 A | * | 7/1969 | Snyder | 30/310 |
| D236,312 S | * | 8/1975 | Brown | D7/672 |
| D272,235 S | * | 1/1984 | Orlando | D9/436 |
| 4,979,419 A | * | 12/1990 | Sonkin | 83/875 |
| D397,277 S | * | 8/1998 | Gibbs, Jr. | D7/696 |
| 5,799,401 A | * | 9/1998 | Gering | 30/300 |
| 6,874,237 B2 | * | 4/2005 | Robitaille | 30/316 |
| D680,389 S | * | 4/2013 | Zemel et al. | D7/672 |
| 2010/0132625 A1 | * | 6/2010 | Dionne | 119/602 |

* cited by examiner

*Primary Examiner* — Dana Ross
*Assistant Examiner* — Renee L Miller
(74) *Attorney, Agent, or Firm* — Christie, Parker & Hale, LLP

(57) ABSTRACT

A breading removal device includes a base having a top surface and a bottom surface; a plurality of teeth protruding from the bottom surface of the base for pressing into and removing a breading portion of a baked item; and a handle attached to the top surface of the base for rotating or moving the base and the plurality of teeth pressed into the breading portion. The base may be planar and substantially round, rectangular, square, or oval shaped. The base may be made of metal, plastic, wood, ceramic, or a combination thereof. The handle may be substantially straight, or in a shape of a cross. Each of the teeth may have a tapered tip and the teeth may be arranged in an inner ring or square and an outer ring or square. The base, the handle, and the teeth may be formed as a single unitary unit.

13 Claims, 5 Drawing Sheets

TOP VIEW

BOTTOM VIEW

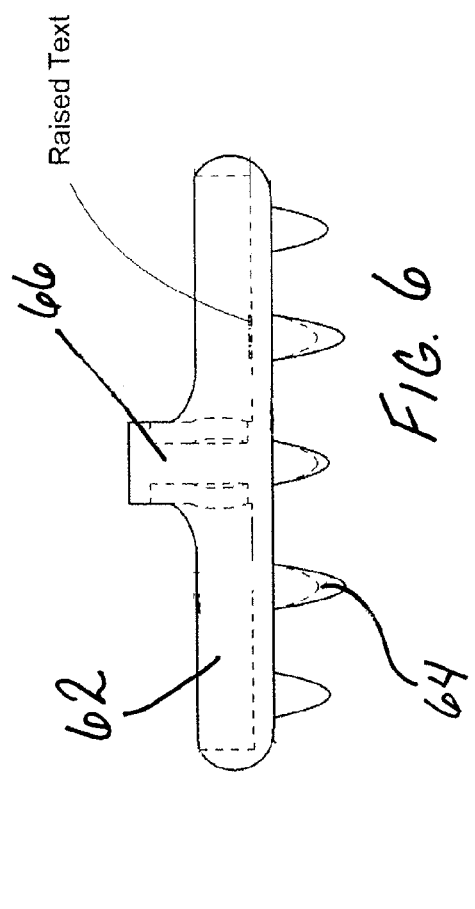
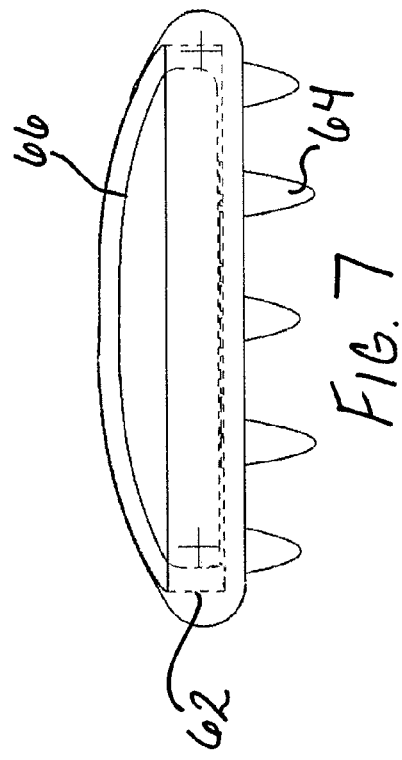
FRONT VIEW
SIDE VIEW

DEVICE FOR REMOVING BREADING OF BAKED ITEMS

CROSS REFERENCE TO RELATED APPLICATIONS

This Patent Application claims the benefits of U.S. Provisional Patent Application Ser. No. 61/451,307, filed on Mar. 10, 2011 and entitled "Manual Breading Routing Device For Baked Goods," the entire content of which is hereby expressly incorporated by reference.

FIELD OF THE INVENTION

The present invention relates to a hand held single unit device, which can be placed on the breading surface of a baked item and rotated or moved to remove a portion of the breading from the baked item.

BACKGROUND

People are increasingly becoming health conscience. A variety of different dietary plans are being introduced and adapted by many, every year. One common theme among most of the dietary plans is to reduce the daily carbohydrates intake. At the same time, different baked items, such as bagels and gourmet bread rolls are increasingly popular. Accordingly, many people tend to take some of the breading inner portion of the bagels and bread rolls out to reduce the amount of breading and thereby the number of carbohydrates in the baked piece. Moreover, removing a portion of the breading may leave the bagel or other piece of baked items with a moat or trough around the center for toppings to rest in and not slide out.

As a result, there is a need for a device that quickly and efficiently removes a portion of the breading of baked items.

SUMMARY

In some embodiments, the present invention is a breading removal device. The device includes a base having a top surface and a bottom surface; a plurality of teeth protruding from the bottom surface of the base for pressing into and removing a breading portion of a baked item; and a handle attached to the top surface of the base for rotating or moving the base and the plurality of teeth pressed into the breading portion.

In some embodiments, the base may be planar and substantially round, rectangular, square, or oval shaped. The base may be made of metal, plastic, wood, ceramic, or a combination thereof.

In some embodiments, the handle may be substantially straight, or in a shape of a cross. Each of the teeth may have a tapered tip and the teeth may be arranged in an inner ring or square and an outer ring or square.

BRIEF DESCRIPTION OF THE DRAWINGS

FIG. 6 is a side view of the bottom of the breading removal device of FIG. 5.

FIG. 7 is a side view of the top the breading removal device of FIG. 5.

DETAILED DESCRIPTION

In some embodiments, the present invention is a hand held single unit device having a multiplicity of spaced teeth on one side and a handle on the other side. The device can be placed on the breading surface of a baked item and move or rotated to remove a portion of the breading.

Figure 1:
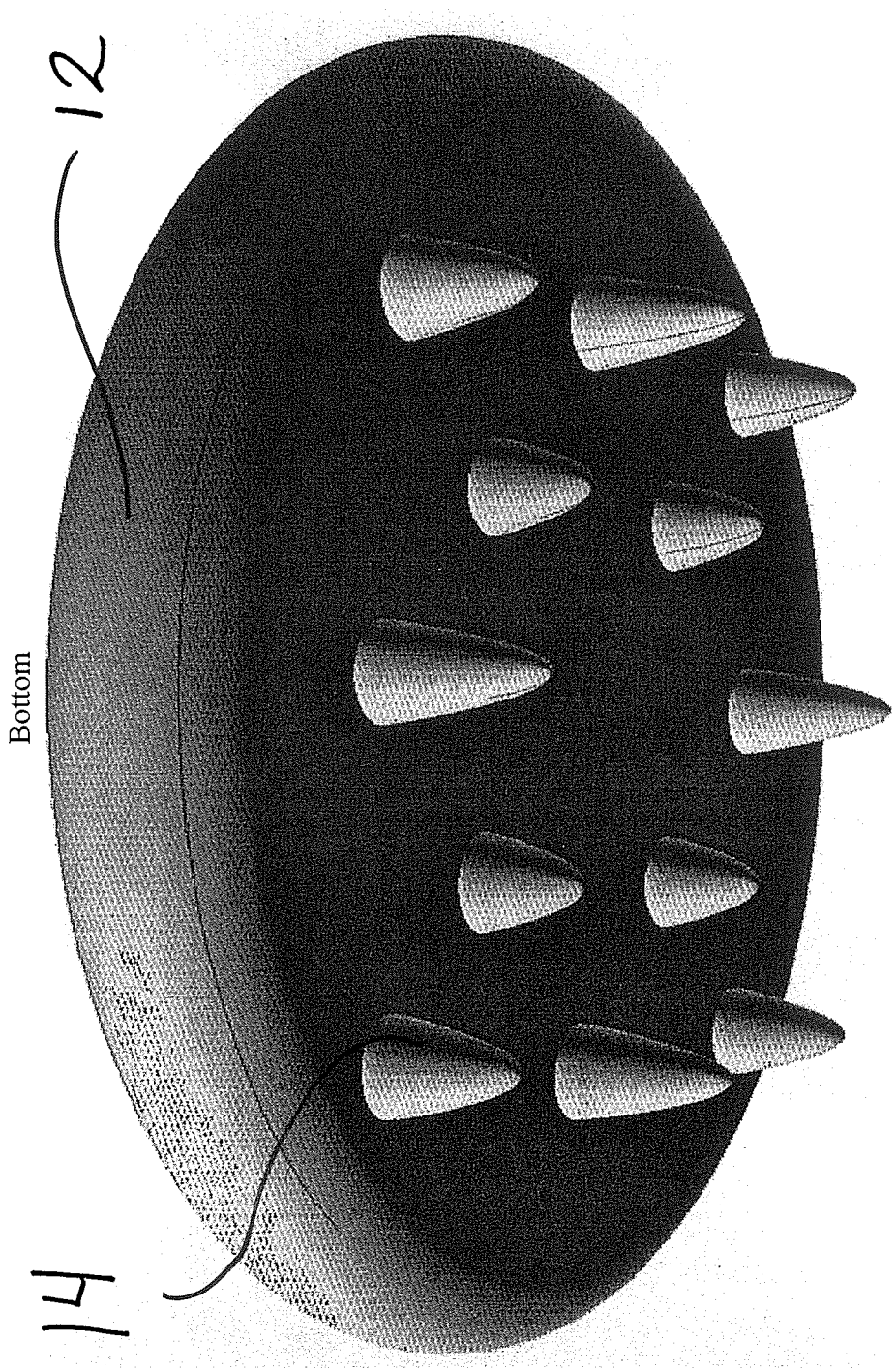
FIG. 1 is a perspective bottom view of an exemplary breading removal device, according to some embodiments of the present invention.
Figure 2:
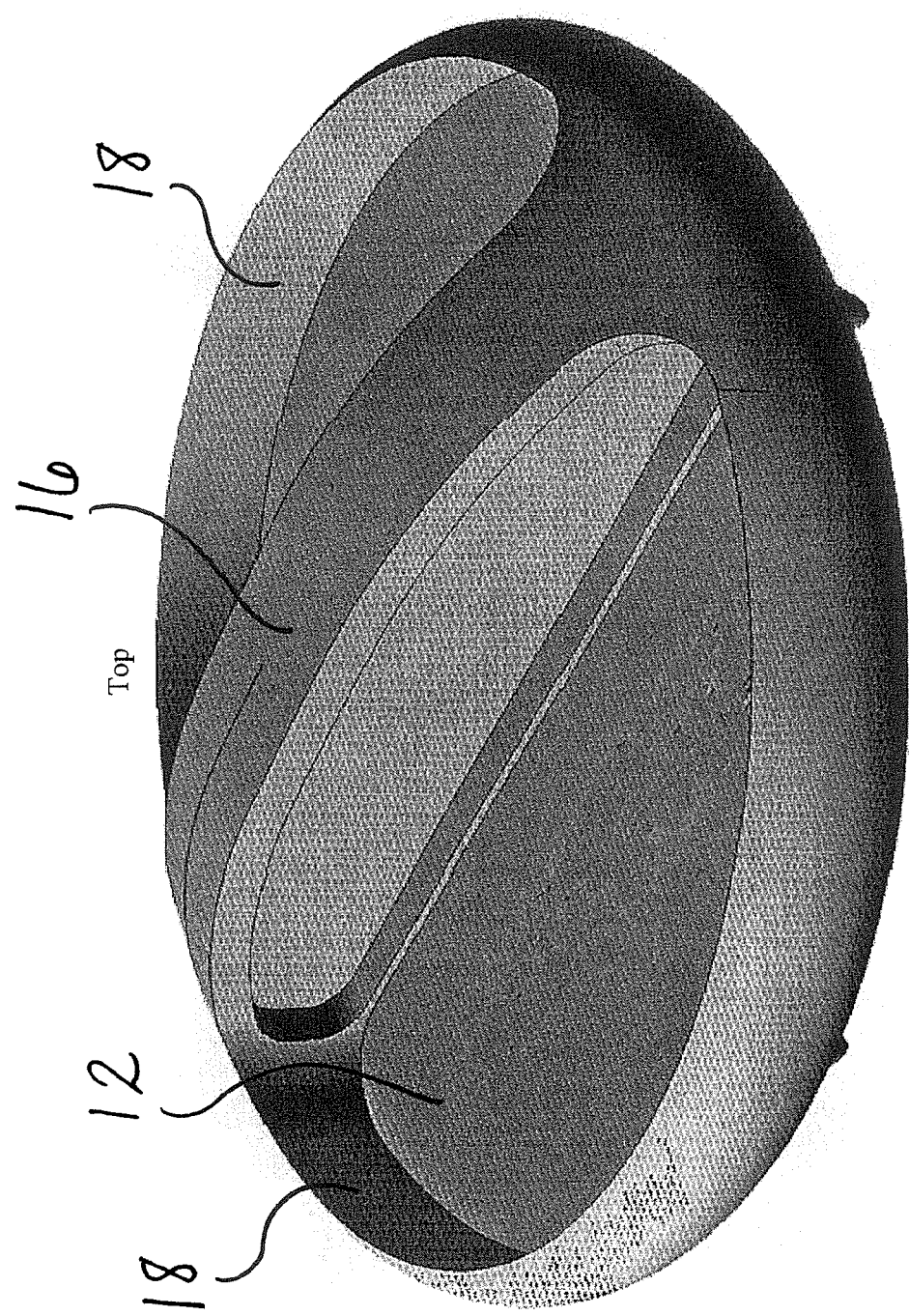
FIG. 2 is a perspective top view of the breading removal device of FIG. 1.

FIG. 1 is a perspective bottom view, and FIG. 2 is a perspective top view of an exemplary breading removal device, according to some embodiments of the present invention. As shown, the device comprises a base 12 that can have any convenient shape, for example, rectangular, oval, square or round, depending on the application of the device to baked items. For example, if the baked item is a round bagel, the base 12 may be substantially round in shape. Alternatively, the device may be substantially oval, rectangular, or square shaped, for a bread roll of the similar shape. The base 12 may be made of a material, such as metal, plastic, wood, ceramic or other rigid or semi-rigid material that can be fabricated for the purpose.

In some embodiments, the base 12 may be planar and shaped in a substantially round shape and having a diameter of about 3¾ inches to about 6 inches. In some embodiments, the base 12 is substantially round with about 1⅞ inches in radius or 3¾ inches in diameter. Additionally, a group of teeth 14 protrude from one side of the base 12 (considered as the bottom), and can be arranged in various shapes. In some embodiments, the protruded teeth may be arranged in two rings, an outer and an inner ring, at the bottom of the base 12, as shown in FIG. 1.

In some embodiments, a group of 12 teeth 14 having a length of from about 9/32 inches to 11/32 inches protrude from the bottom side of the base 12. For example, an outer ring or row may have 8 teeth protruding about 7/16 inches from the bottom of the base 12 and an inner ring or row may have 4 teeth protruding about 9/32 inches from the base 12. In another embodiment, both the outer and inner rings may each have 6 teeth protruding therefrom.

FIG. 2 is a perspective top view of the breading removal device of FIG. 1. As shown, the opposite side of the base 12, considered as the top, may include a handle 16. In some embodiments, the handle 16 may be positioned at the center of the base 12. Moreover, in some embodiments, the handle 16 may sloped from the highest point at the center to both sides of the base 12 to form a hand grip. The handle 16 may have a trough on both sides. In some embodiments, the a top view of the handle 16 may be in the shape of a straight line, a curved line, or a cross-shaped with various angles, for better hand grip. The handle keeps the device from sliding off the baked item and also keeps the user's fingers from sliding off when the user moves/rotates the device.

The handle 16 may be made of a material, such as metal, plastic, wood, ceramic or other rigid or semi-rigid material that can be fabricated for the purpose. In some embodiments, the edges of the base 12 at its perimeter and on the bottom surface (where the teeth are located) have raised portions (wall) 18. In operation, when the teeth are inserted into a breading portion of a baked item, the raised edge 18 leaves a rim around the baked good, for example, a bagel. Moreover, with the raised edge 18, it is possible to route into the inner portion of a baked good while leaving outer rim of the baked good. In some embodiments, the top surface of the base, may also have a raised portion around the handle 16.

In some embodiments, the base, the handle, the teeth (and the raised edges, if any) are all part of a single unitary unit, which make the device more reliable and cheaper to manufacture. For example, the device may be made from a metal, plastic, ceramic or the like mold.

Figure 4:
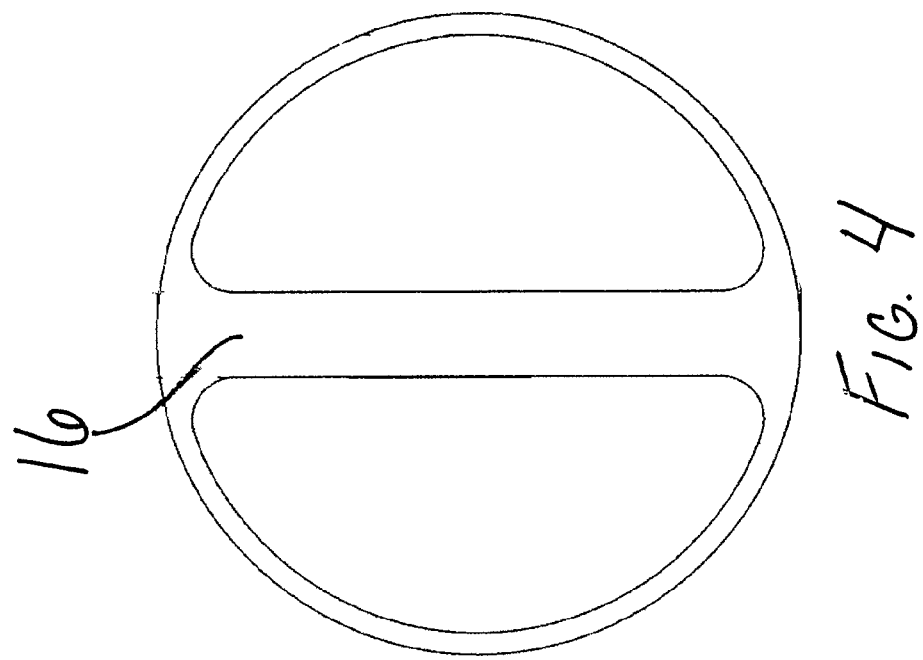
FIG. 4 is a plan view of an exemplary breading removal device, according to some embodiments of the present invention.

In some embodiments, the handle 16 is curved with respect to the top surface of the base and is about ¾ inches at its highest point and includes a ½ inch grip, and a trough that is about 1½ inches at the widest, as shown in FIG. 4.

Figure 3:
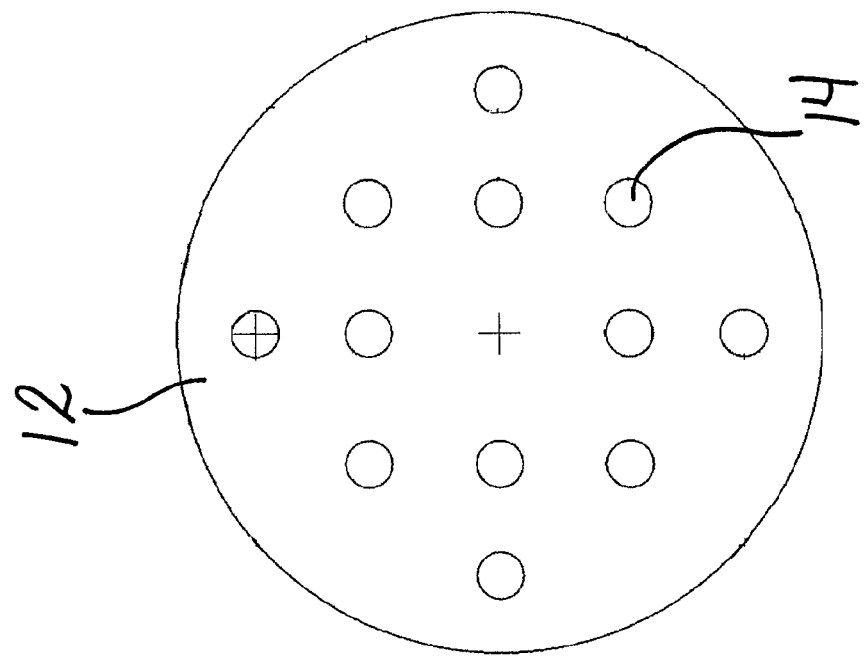
FIG. 3 is a plan view of a bottom of an exemplary breading removal device, according to some embodiments of the present invention.

FIG. 3 is a plan view of a bottom of an exemplary breading removal device, according to some embodiments of the present invention. As shown, there are twelve protruded teeth arranged in two rings or squares, that is, an outer ring/square and an inner ring/square. In some embodiments, the teeth may have a rounded footprint (cylindrical shape) and may be tapered at their outer ends, as shown in FIGS. 1, 6 and 7.

Figure 5:
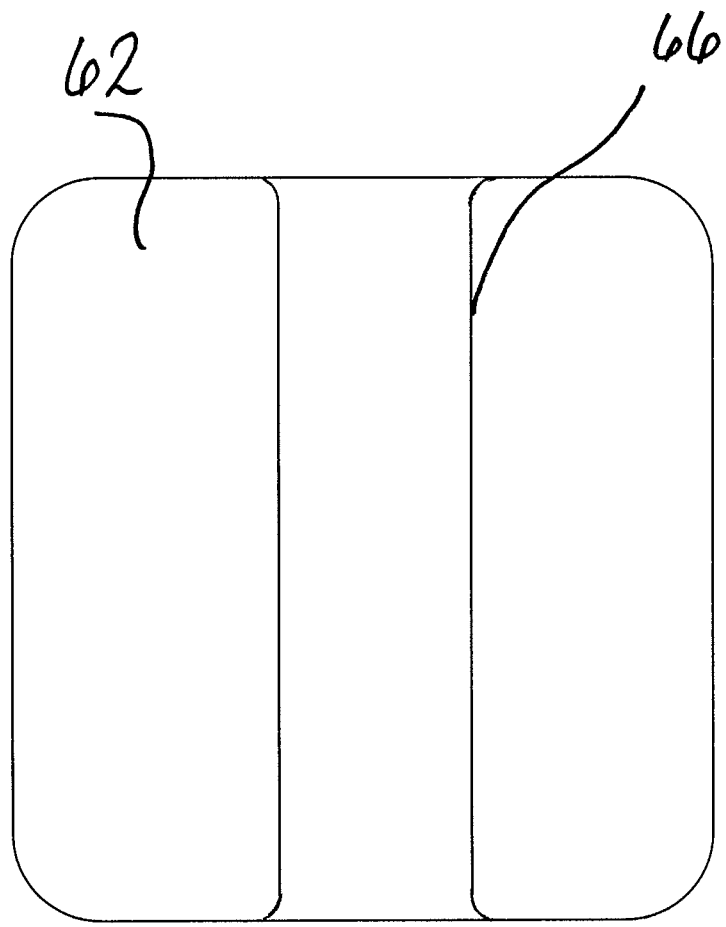
FIG. 5 is a plan view of an exemplary breading removal device, according to some embodiments of the present invention.

FIG. 5 is a plan view of an exemplary breading removal device, according to some embodiments of the present invention. As shown, in these embodiments, the base 62 is planar and substantially square-shaped. Moreover, the handle 66 may have a crossed shape for ease of grip and movement.

FIG. 6 is a side view of the bottom and FIG. 7 is a side view of the top of the breading removal device of FIG. 5. As shown, teeth 64 may have different lengths. For example, the teeth on the outer boundary may be longer than the teeth in the inner boundary, or vise versa (not shown). Furthermore, the outer tips of the teeth are tapered for ease of pressing into the breading of the baked piece.

In operation, the device is placed on the breading surface of the baked item, pressed in and moved or rotated to remove the breading of the baked item in a quick and efficient manner. In some embodiments, the piece of baked items is a bagel that has been sliced in half to produce two halves, each having a crusted side and a softer breading side. Using the handle 16, a user may twist the device back and forth on top of the sliced bagel to rout out a portion of the breading. The device can also be used on sandwich breads or rolls to make a trough as a place for ingredients and sandwich fillings to fit into and not slide out when the sandwich is handled. More teeth 14 can be added to the device to permit more breading to be removed from a baked piece.

In alternative embodiments, the teeth 14 may be arranged in various patterns other than rings or they may be arranged randomly. The device can also be used to shape any porous, pumice or similarly brittle material.

It should be understood, of course, that the foregoing relates to exemplary embodiments of the invention and that modifications may be made without departing from the spirit and scope of the invention as set forth in the following claims.

It will be recognized by those skilled in the art that various modifications may be made to the illustrated and other embodiments of the invention described above, without departing from the broad inventive scope thereof It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A breading removal device comprising:
   a base having a top surface and a bottom surface;
   a plurality of teeth protruding from the bottom surface of the base for pressing into and removing a breading portion of a baked item; wherein each of the plurality of teeth has a rounded footprint and a conical shape, and wherein the plurality of teeth are arranged in an inner ring or square and an outer ring or square; and
   a handle attached to the top surface of the base for rotating or moving the base and the plurality of teeth pressed into the breading portion.

2. The breading removal device of claim 1, wherein the base is planar and substantially round shaped.

3. The breading removal device of claim 1, wherein the base is planar and substantially square shaped.

4. The breading removal device of claim 1, wherein the base is made of metal, plastic, wood, or ceramic.

5. The breading removal device of claim 1, wherein a top view of the handle is substantially straight.

6. The breading removal device of claim 1, wherein the handle is made of metal, plastic, wood, or ceramic.

7. The breading removal device of claim 1, wherein each of the plurality of teeth has a tapered tip.

8. The breading removal device of claim 1, wherein the plurality of teeth are twelve.

9. The breading removal device of claim 1, wherein the base at its perimeter and on the bottom surface includes a raised portion.

10. The breading removal device of claim 1, wherein the base at its perimeter and on the top surface includes a raised portion around the handle.

11. The breading removal device of claim 1, wherein the base, the handle, and the teeth are formed as a single unitary unit.

12. The breading removal device of claim 1, wherein the handle is sloped from a highest point at the center to opposite sides of the base and includes a trough on both sides.

13. The breading removal device of claim 1, wherein an outer end of the plurality of teeth are arranged in the inner ring or square has a different distance from the base than the outer end of the plurality of teeth are arranged in the outer ring or square.

\* \* \* \* \*